(12) United States Patent
Akiyama et al.

(10) Patent No.: US 8,026,678 B2
(45) Date of Patent: Sep. 27, 2011

(54) MOTOR CONTROL DEVICE

(75) Inventors: Shigeki Akiyama, Ichinomiya (JP); Masatoshi Hirano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 590 days.

(21) Appl. No.: 12/055,278

(22) Filed: Mar. 25, 2008

(65) Prior Publication Data

US 2008/0238347 A1 Oct. 2, 2008

(30) Foreign Application Priority Data

Mar. 30, 2007 (JP) ................................ 2007-094722
Mar. 30, 2007 (JP) ................................ 2007-094723

(51) Int. Cl.
*H02P 1/54* (2006.01)
(52) U.S. Cl. ................... 318/34; 318/400.01; 318/599; 318/625
(58) Field of Classification Search ................... 318/66, 318/255, 560, 599, 603, 625, 700, 400.01, 318/400.1, 400.09, 400, 445, 34, 503, 432, 318/434, 811
See application file for complete search history.

(56) References Cited

U.S. PATENT DOCUMENTS

| | | | | |
|---|---|---|---|---|
| 4,644,232 A | * | 2/1987 | Nojiri et al. | 318/66 |
| 5,130,710 A | * | 7/1992 | Salazar | 341/11 |
| 6,608,459 B2 | * | 8/2003 | Kasagami et al. | 318/560 |

FOREIGN PATENT DOCUMENTS

| | | | |
|---|---|---|---|
| JP | S62-272885 A | | 11/1987 |
| JP | H07-302749 A | | 11/1995 |
| JP | 2002-186288 A | | 6/2002 |
| JP | 2002-272184 A | | 9/2002 |
| JP | 2003-009570 A | | 1/2003 |
| JP | 2003009570 A | * | 1/2003 |
| JP | 2007-043794 A | | 2/2007 |

OTHER PUBLICATIONS

Japan Patent Office; Notice of Reasons for Rejection in Japanese Patent Application No. 2007-094722 (counterpart to the above-captioned U.S. patent application) mailed Sep. 15, 2009 (partial translation).

Japan Patent Office; Notice of Reasons for Rejection in Japanese Patent Application No. 2007-094723 (counterpart to the above-captioned U.S. patent application) mailed Sep. 15, 2009 (partial translation).

* cited by examiner

*Primary Examiner* — Walter Benson
*Assistant Examiner* — Antony M Paul
(74) *Attorney, Agent, or Firm* — Baker Botts L.L.P.

(57) ABSTRACT

A motor control device includes at least one operating unit that is provided corresponding to at least one motor to operate the at least one motor, and a control unit that, each time at least one control cycle arrives in which the at least one motor is operated, sets a manipulated variable of the at least one motor to the at least one operating unit that operates the at least one motor of which the at least one control cycle arrives.

15 Claims, 14 Drawing Sheets

FIG.4

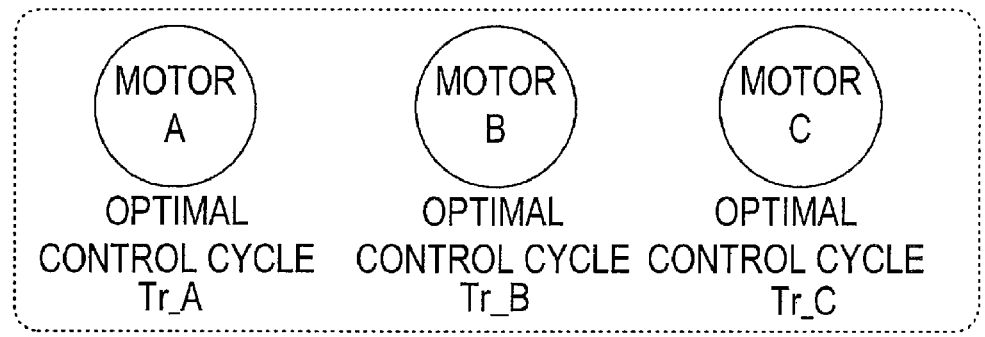

MOTOR A
OPTIMAL CONTROL CYCLE Tr_A

MOTOR B
OPTIMAL CONTROL CYCLE Tr_B

MOTOR C
OPTIMAL CONTROL CYCLE Tr_C

STEP [1]

CALCULATE GREATEST COMMON DIVISOR Tm OF Tr_A, Tr_B, Tr_C

STEP [2]

DETERMINE GREATEST COMMON DIVISOR Tm
TO BE INPUT CYCLE Ts OF INTERRUPTION SIGNAL
Ts ← Tm

STEP [3]

DETERMINE CONTROL CYCLE Ts1 OF MOTOR A
TO BE (Tr_A/Ts) TIMES AS LONG AS INPUT CYCLE Ts

DETERMINE CONTROL CYCLE Ts2 OF MOTOR B
TO BE (Tr_B/Ts) TIMES AS LONG AS INPUT CYCLE Ts

DETERMINE CONTROL CYCLE Ts3 OF MOTOR C
TO BE (Tr_C/Ts) TIMES AS LONG AS INPUT CYCLE Ts

STEP [4]

SET INPUT CYCLE OF INTERRUPTION SIGNAL AND
CONTROL CYCLE OF EACH MOTOR
ACCORDING TO RESULT OF DETERMINATION TO
BUILD CONTROL SYSTEM

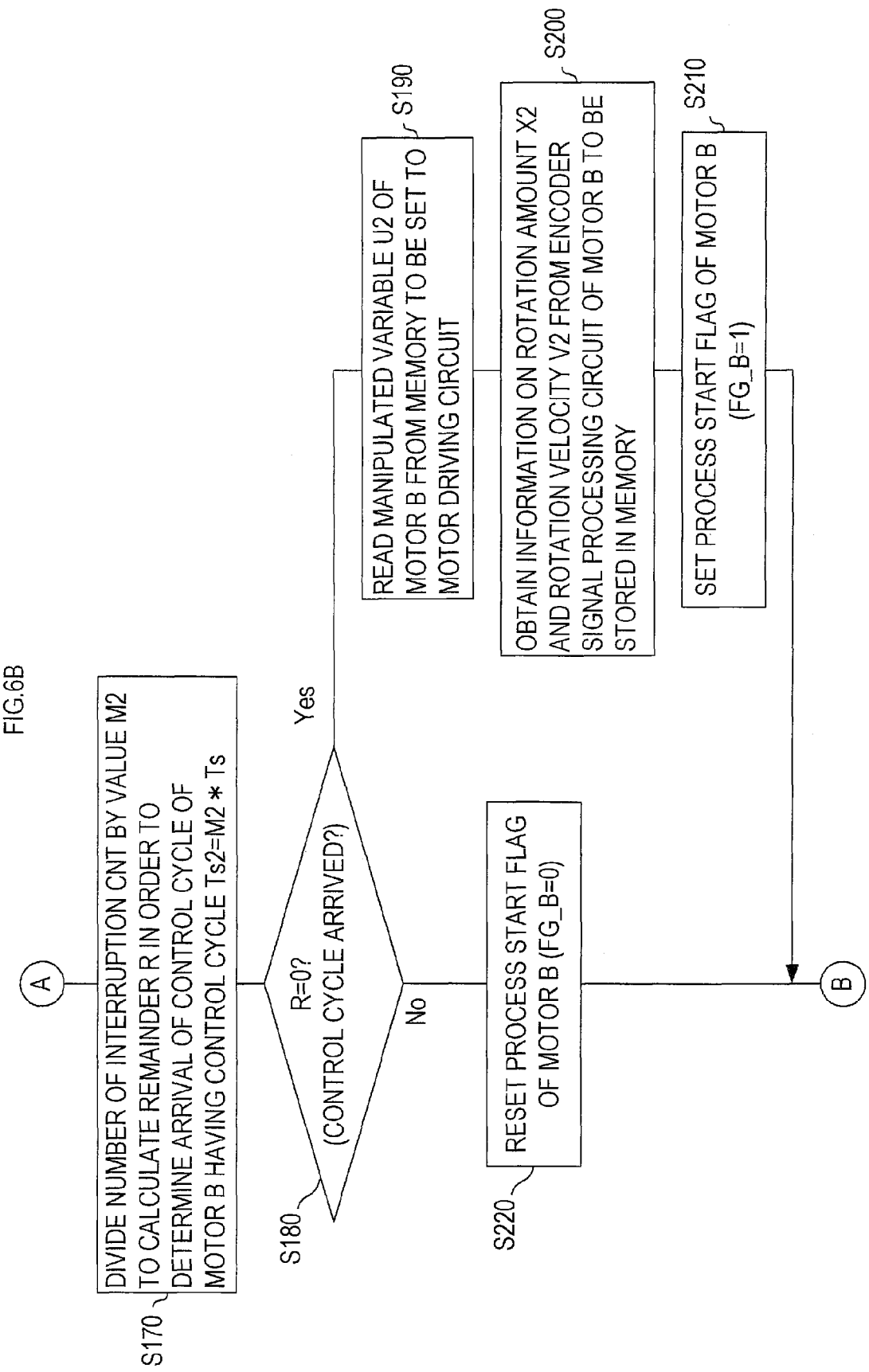

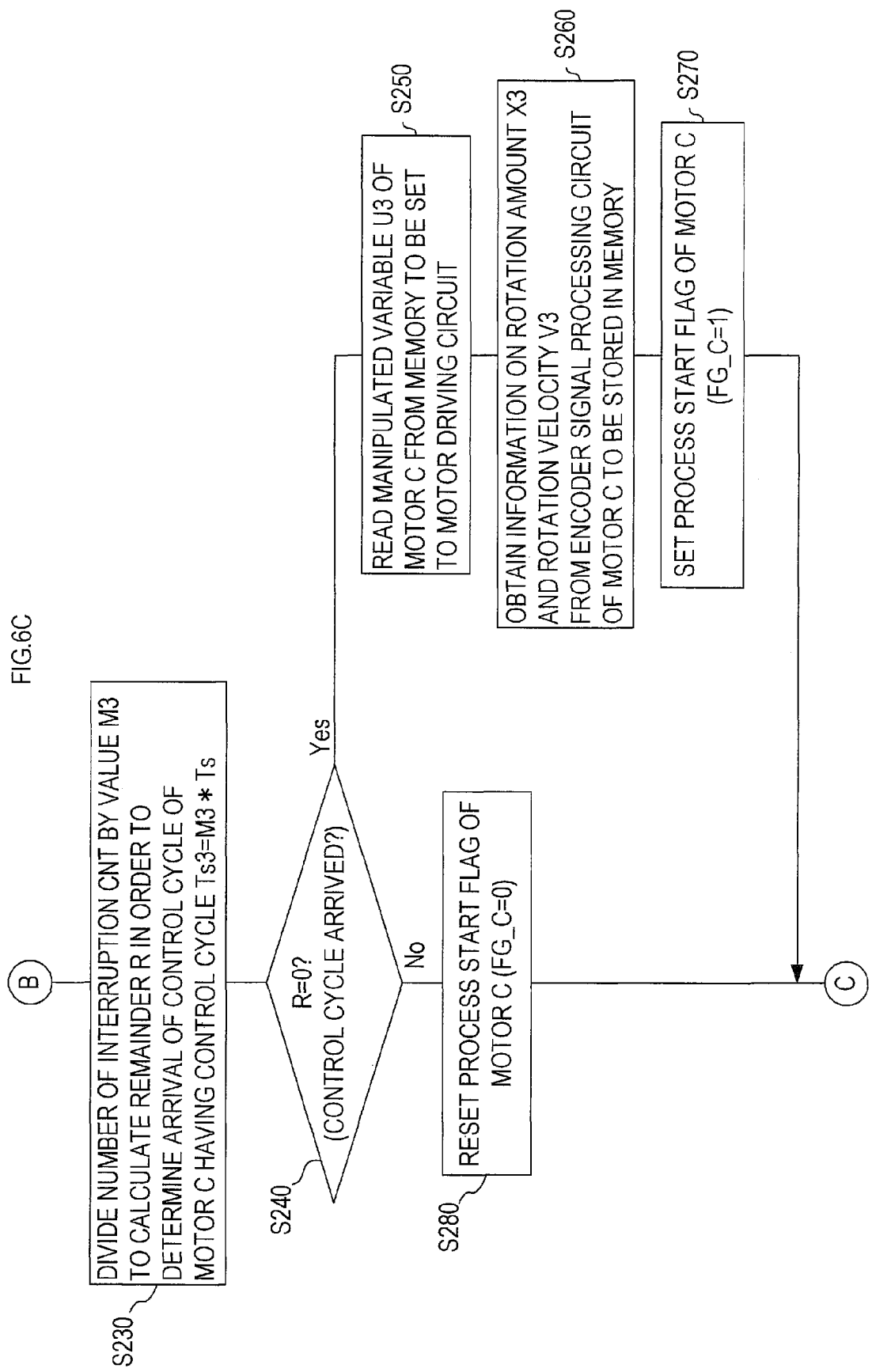

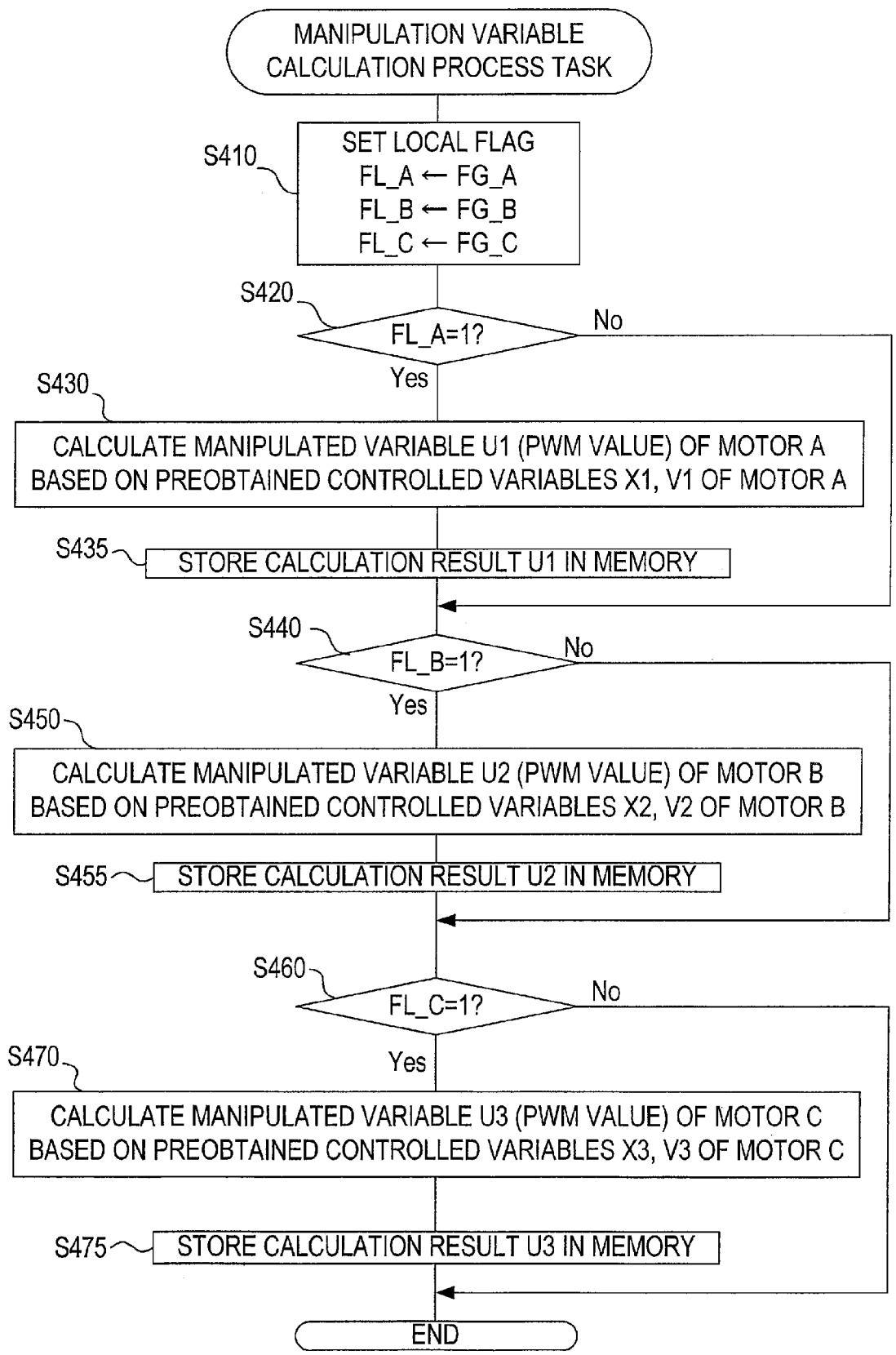

INTERRUPTION

INTERRUPTION  DELAY IN INPUT/
OUTPUT OPERATION

MOTOR CONTROL DEVICE

CROSS-REFERENCE TO RELATED APPLICATIONS

This application claims the benefit of Japanese Patent Application Nos. 2007-094722 and 2007-094723 both filed Mar. 30, 2007 in the Japan Patent Office, the disclosures of which are incorporated herein by reference.

BACKGROUND

This invention relates to a motor control device that controls at least one motor.

One type of a conventionally known motor control device controls a plurality of motors which drive different driven targets by means of a single control unit (such as a microcomputer). More particularly, this type of motor control device achieves motor control as follows. That is, a manipulated variable for a motor is calculated, for example based on input signals from an encoder that outputs pulse signals in accordance with rotation of the motor. Then, a process for setting the manipulated variable to a motor driving circuit (hereinafter, referred to as a "control process") is repeated per motor. However, the single control unit is not capable of executing the control process of the plurality of motors in parallel. Accordingly, the conventional motor control device repeatedly performs the control process to each motor in sequence so as to virtually control each motor in parallel.

Also, in such a conventional motor control device, a different control cycle is defined per each motor. Each motor is controlled by the control process of each motor which is executed per control cycle of the corresponding motor.

One example of such a motor control device is provided with a plurality of timers each provided corresponding to each motor. More particularly in this example, interruption signals are supplied from the plurality of timers to a control unit in cycles predetermined in the plurality of timers. Each time the interruption signal is supplied, the control unit executes the control process of the corresponding motor so that the plurality of motors are controlled in the corresponding cycles.

In another example, control cycle of a motor having the shortest optimal control cycle out of control cycles of a plurality of motors is set to an execution cycle Ts of the control process. Each time the execution cycle Ts arrives, the interruption signal is supplied to a control unit from one timer.

Particularly, as shown in FIG. 11, the control cycle of the motor having the shortest optimal control cycle is defined as the execution cycle Ts of the control process. The control cycles of other motors are defined as integral multiples of the execution cycle Ts. Each time the execution cycle Ts arrives, the control process of the motor of which control cycle has arrived is carried out in sequence. In this manner, each motor is virtually controlled in parallel in a different control cycle. That is, the above control process is executed to the motor having the same control cycle as the execution cycle Ts each time the execution cycle Ts arrives, while, with respect to a motor having a control cycle of M (M: an integer of two and above) times as long as the execution cycle Ts, the control process is executed each time the number of times of arrival of the execution cycle Ts reaches an integral multiple of M.

SUMMARY

It would be desirable that, each time at least one control cycle arrives in which at least one motor is operated, a manipulated variable of the at least one motor can be reliably set to at least one operating unit that operates the at least one motor.

In a first aspect of the present invention, a motor control device includes at least one operating unit and a control unit. The at least one operating unit is provided corresponding to at least one motor to operate the at least one motor. Each time at least one control cycle arrives in which the at least one motor is operated, the control unit sets a manipulated variable of the at least one motor to the at least one operating unit provided corresponding to the at least one motor of which the at least one control cycle arrives.

According to the motor control device in the first aspect, each time at least one control cycle arrives in which at least one motor is operated, a manipulated variable of the at least one motor can be reliably set to at least one operating unit that operates the at least one motor.

In a second aspect of the present invention, a motor control device includes a plurality of operating units and a control unit. Each of the plurality of operating units is provided corresponding to each of a plurality of motors to operate each of the plurality of motors. Each time each of a plurality of control cycles arrives in which each of the plurality of motors is operated, the control unit sets a manipulated variable of the motor among the plurality of motors of which control cycle has arrived to the operating unit provided corresponding to the motor of which control cycle has arrived. More particularly, the control unit sets a manipulated variable of the motor having the shortest control cycle out of the plurality of control cycles to the operating unit among the plurality of operating units provided corresponding to the motor having the shortest control cycle out of the plurality of control cycles for every N (N: an integer of two and above)×S (S: an integer of one and above) times an execution cycle arrives which is one Nth of the shortest control cycle. Moreover, the control unit sets a manipulated variable of the motor other than the motor having the shortest control cycle to the operating unit among the plurality of operating units provided corresponding to the motor other than the motor having the shortest control cycle for every M (M: an integer of N and above)×S times the execution cycle arrives.

According to the motor control device in the second aspect, the control cycle of each motor can be set more appropriately than before when the control cycle of the motor having the shortest optimal control cycle was defined as the execution cycle. That is, the manipulated variable of each motor can be updated in an appropriate cycle. Each motor can be controlled with high precision.

In a third aspect of the present invention, a motor control device includes a plurality of operating units and a control unit. Each of the plurality of operating units is provided corresponding to each of a plurality of motors to operate each of the plurality of motors. Each time each of a plurality of control cycles arrives in which each of the plurality of motors is operated, the control unit sets a manipulated variable of the motor among the plurality of motors of which control cycle has arrived to the operating unit which operates the motor of which control cycle has arrived. More particularly, the control unit sets a manipulated variable to the operating unit provided corresponding to the motor among the plurality of motors of which corresponding control cycle has arrived each time an execution cycle arrives which is equal to a common divisor of the plurality of control cycles and smaller than the shortest control cycle out of the plurality of control cycles.

According to the motor control device in the third aspect, the control cycle of each motor can be set more appropriately than before when the control cycle of the motor having the shortest optimal control cycle was defined as the execution cycle. That is, the manipulated variable of each motor can be updated at an appropriate cycle. Each motor can be controlled with high precision.

In a fourth aspect of the present invention, a motor control device includes at least one rotation amount detecting unit, a storage unit, an input/output unit, and a manipulated variable calculation unit. The at least one rotation amount detecting unit is provided corresponding to at least one motor to detect a rotation amount of the at least one motor. The storage unit stores a manipulated variable of the at least one motor. Each time at least one control cycle arrives in which the at least one motor is operated, the input/output unit acquires a detection result from the at least one rotation amount detecting unit and the manipulated variable of the at least one motor from the storage unit to set the acquired manipulated variable to the at least one operating unit. When the manipulated variable of the at least one motor is set by the input/output unit, the manipulated variable calculation unit newly calculates a manipulated variable of the at least one motor based on the detection result acquired by the input/output unit to store the calculated manipulated variable in the storage unit.

According to the motor control device in the fourth aspect, even if calculation time of a manipulated variable is extended, a manipulated variable can be set to at least one operating unit in a certain cycle (predetermined control cycle of a motor) with high precision. Also, a rotation amount of at least one motor can be acquired in a certain cycle with high precision. Calculating operation of a manipulated variable can be executed based on the rotation amount of the at least one motor.

In a fifth aspect of the present invention, a motor control device includes a plurality of operating units, a control unit, a plurality of rotation amount detecting units, and a storage unit. Each of the plurality of operating units is provided corresponding to each of a plurality of motors to operate each of the plurality of motors. The control unit sets manipulated variables of the plurality of motors. Each of the plurality of rotation amount detecting units is provided corresponding to each of the plurality of motors to detect a rotation amount of each of the plurality of motors. The storage unit stores the manipulated variables of the plurality of motors.

More particularly, the control unit includes an input/output unit and a manipulated variable calculation unit. Each time an execution cycle arrives which is equal to a common divisor of the plurality of control cycles and smaller than the shortest control cycle out of the plurality of control cycles, the input/output unit acquires a detection result from the rotation amount detecting unit provided corresponding to the motor of which control cycle has arrived and the manipulated variable of the motor of which control cycle has arrived from the storage unit to set the acquired manipulated variable to the operating unit provided corresponding to the motor. The manipulated variable calculation unit, when the manipulated variable of the motor is set by the input/output unit, newly calculates a manipulated variable of the motor based on the detection result acquired by the input/output unit to store the calculated manipulated variable in the storage unit.

According to the motor control device in the fifth aspect, the control cycle of each motor can be set more appropriately than before when the control cycle of the motor having the shortest optimal control cycle was defined as the execution cycle. Moreover, even if the calculation time of a manipulated variable is extended, a manipulated variable to each motor can be set to each operating unit in a certain cycle (predetermined control cycle of a motor) with high precision. A rotation amount of each motor can be also acquired in a certain cycle with high precision. Calculating operation of a manipulated variable can be executed based on the rotation amount of each motor.

BRIEF DESCRIPTION OF THE DRAWINGS

The invention will now be described below, by way of example, with reference to the accompanying drawings, in which:

FIG. 4 is an explanatory view showing setting steps of an input cycle of an interruption signal and control cycles of the plurality of motors;

FIG. 6B is a flowchart showing a first intermediate part of the input/output process executed by the controller of the first embodiment;

FIG. 6C is a flowchart showing a second intermediate part of the input/output process executed by the controller of the first embodiment;

FIG. 7 is a flowchart showing process steps of a manipulated variable calculation process task according to the first embodiment;

DETAILED DESCRIPTION OF THE PREFERRED EMBODIMENT

First Embodiment

Figure 1:
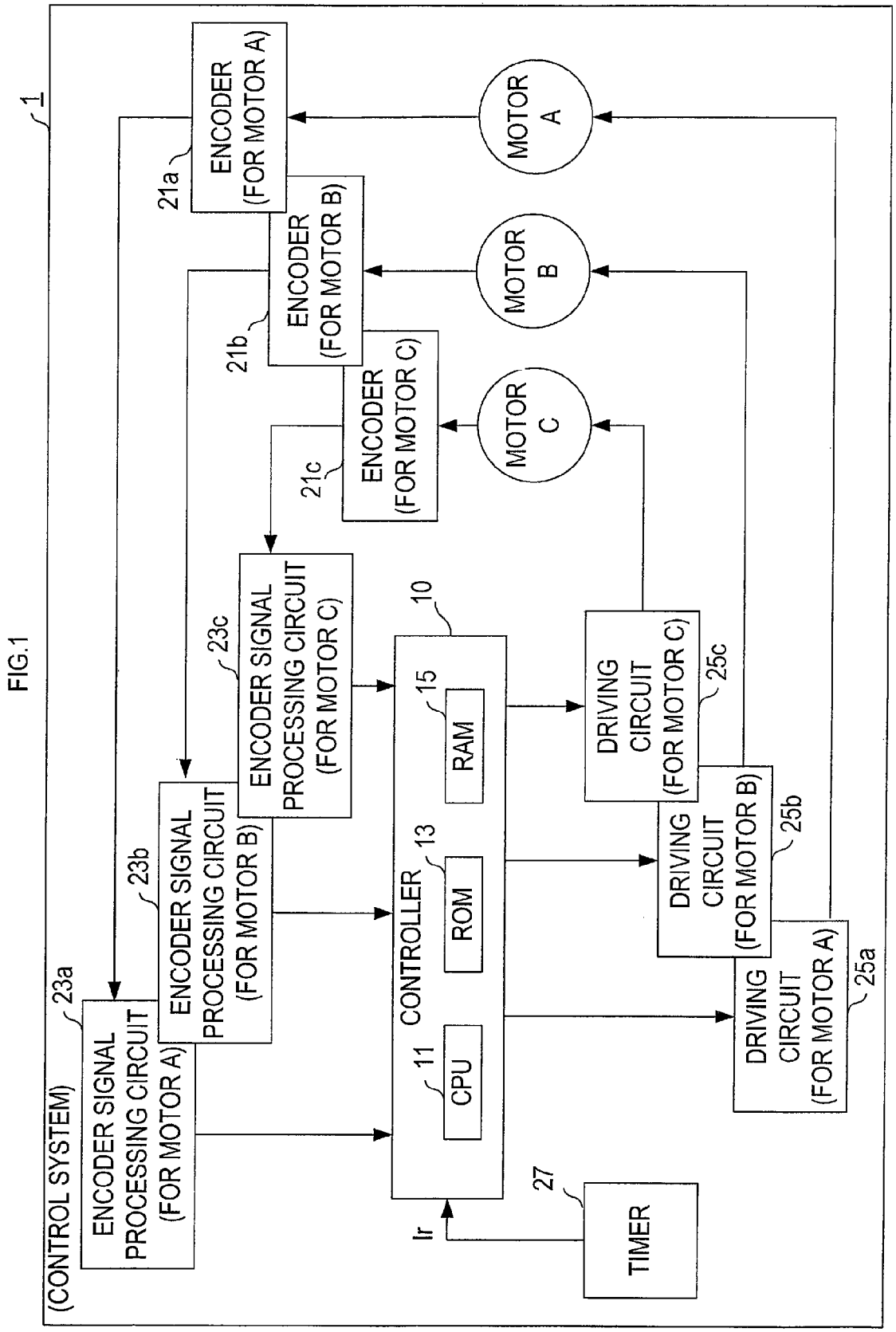
FIG. 1 is a block diagram showing a structure of a control system according to a first embodiment.

Referring to FIG. 1, a control system 1 of the first embodiment controls a plurality of motors A, B and C through a single controller 10. For example, the control system 1 is used as a control system of a printing mechanism 100 in an inkjet printer, as shown in FIG. 2.

When applying the control system 1 of the first embodiment to the control system of the printing mechanism 100, a CR motor 105, an ACF motor 115 and a LF motor 129 are controlled by the single controller 10. The CR motor 105 drives a carriage 103 mounting an inkjet head 101 thereon in a main scanning direction. The ACF motor 115 drives a sheet feed roller 113 which supplies a sheet P from a sheet feed tray 111. The LF motor 129 drives a sheet conveyance roller 123 and a sheet discharge roller 127. The sheet conveyance roller 123 firmly holds the supplied sheet P together with a pinch roller 121 and conveys the sheet P to a printing position. The sheet discharge roller 127 is linked to the sheet conveyance roller 123. The sheet discharge roller 127 firmly holds the supplied sheet P conveyed from the side of the sheet conveyance roller 123 together with a pinch roller 125 and discharges the sheet P.

Figure 2:
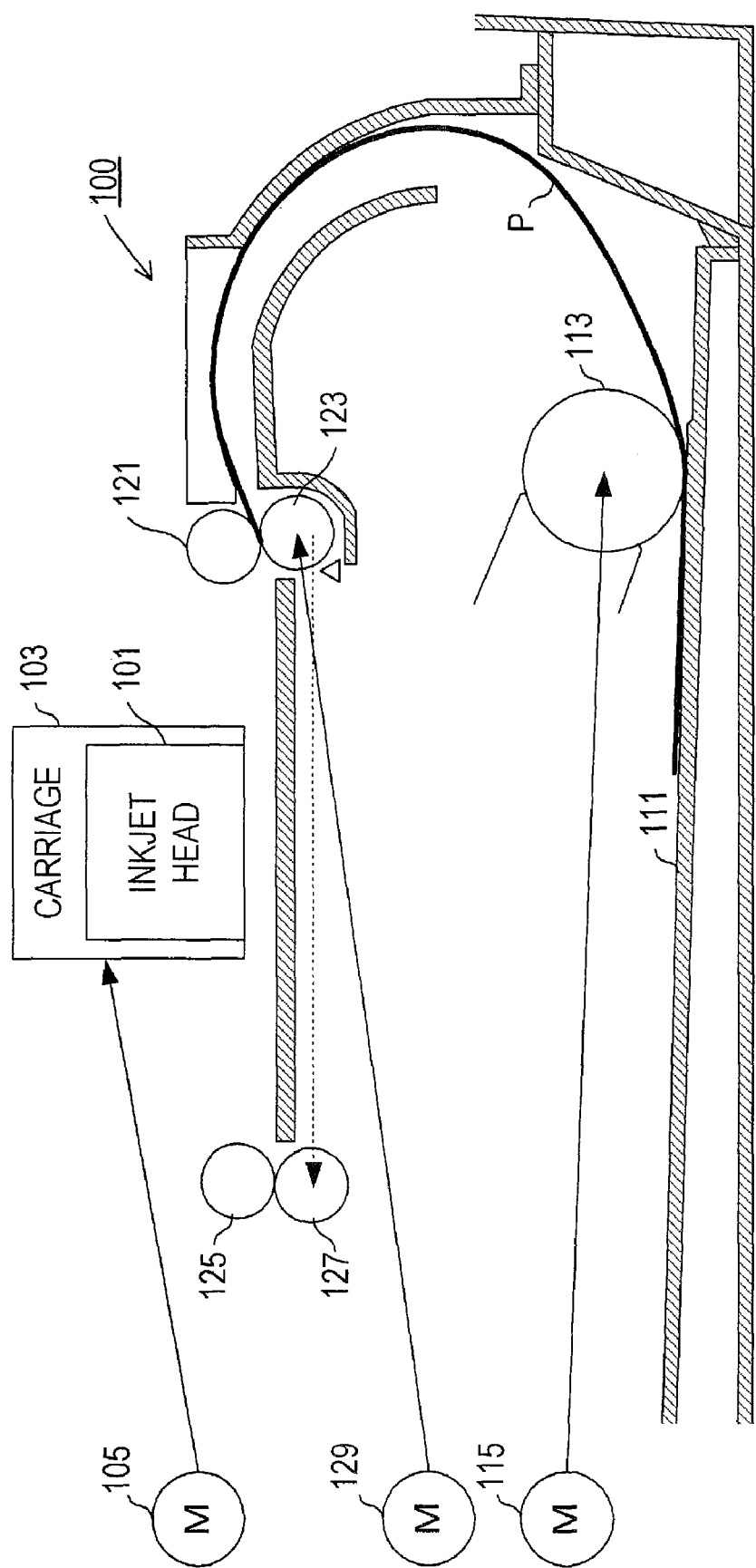
FIG. 2 is a schematic cross-sectional view showing a structure of a printing mechanism according to the first embodiment.

Particularly, in order to perform printing in the printing mechanism 100 shown in FIG. 2, it is necessary that the sheet feed roller 113 is rotated so as to convey the sheet P on the sheet feed tray 111 to the side of the sheet conveyance roller 123. When the sheet P reaches the sheet conveyance roller 123, the sheet conveyance roller 123 is rotated while rotation of the sheet feed roller 113 is maintained so as to convey the sheet P to a printing position. Upon start of printing, it is necessary to perform flushing operation by which ink is ejected to clean the nozzles of the inkjet head 101. In this case, it is necessary to move the carriage 103 to a flushing position. Also, it is necessary to control the CR motor 105, the ACF motor 115 and the LF motor 129 around the same time.

Figure 3:
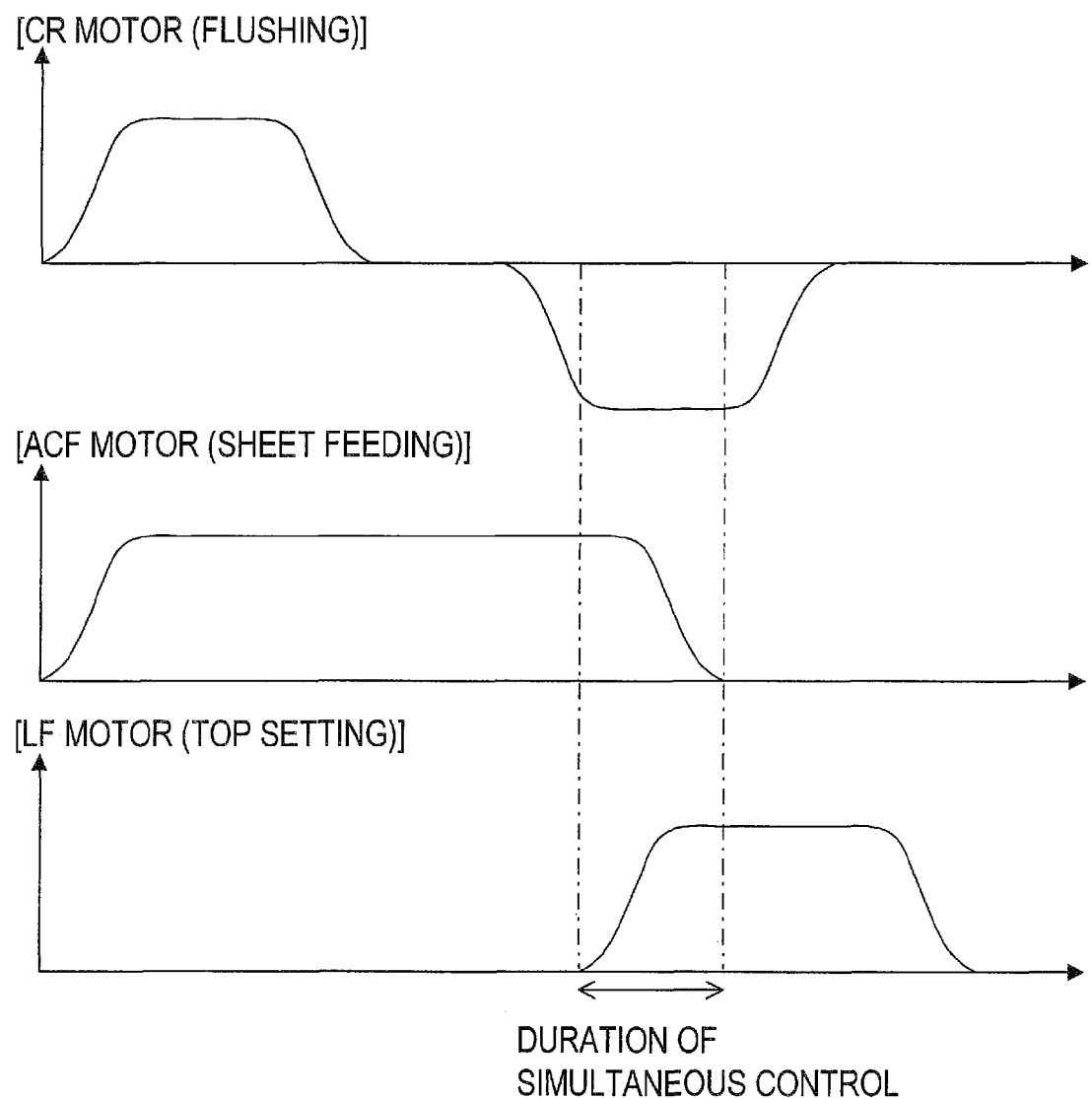
FIG. 3 is an explanatory view showing operational examples of a plurality of motors which drive the printing mechanism according to the first embodiment.

FIG. 3 includes graphs in which the horizontal axes correspond to time and the vertical axes correspond to motor velocity. The upper graph shows operation of the CR motor 105, the middle graph shows operation of the ACF motor 115, and the lower graph shows operation of the LF motor 129, at the start of a printing process. As shown in FIG. 3, it is necessary to simultaneously control the CR motor 105, the ACF motor 115 and the LF motor 129 for a specific period. The control system 1 of the present embodiment is applied to a control system having a plurality of motors as such. The plurality of motors are controlled by the single controller 10.

Particularly, the control system 1 of the first embodiment includes the controller 10 that controls the motors A, B and C. As shown in FIG. 1, the control system 1 includes encoders 21, encoder signal processing circuits 23 and motor driving circuits 25 for respective controlled targets, that is, the motors A, B and C. The control system 1 also includes a timer 27 that supplies an interruption signal Ir to the controller 10 at a predetermined cycle Ts. Hereinafter, the encoder 21, the encoder signal processing circuit 23 and the motor driving circuit 25 of the motor A are referred as an encoder 21a, an encoder signal processing circuit 23a and a motor driving circuit 25a, respectively. The encoder 21, the encoder signal processing circuit 23 and the motor driving circuit 25 of the motor B are referred as an encoder 21b, an encoder signal processing circuit 23b and a motor driving circuit 25b, respectively. The encoder 21, the encoder signal processing circuit 23 and the motor driving circuit 25 of the motor C are referred as an encoder 21c, an encoder signal processing circuit 23c and a motor driving circuit 25c, respectively.

The encoders 21 of the motors A, B and C provided in the control system 1 are known as rotary encoders or linear encoders. Each of the encoders 21 outputs a pulse signal in accordance with rotation of the corresponding motor A, B or C. The pulse signal is supplied to the corresponding encoder signal processing circuit 23 of the motor A, B or C. Based on the pulse signal, the corresponding encoder signal processing circuit 23 calculates a rotation amount (position coordinate) X and a rotation velocity V of the motor A, B or C with reference to a predetermined time point (reset time). When the control system 1 is applied to the control system of the printing mechanism 100, the rotation amount of the motor A represents a position coordinate of the carriage, and the rotation amounts of the motors B and C represent conveying amounts of the sheet P.

In the controller 10, the rotation amount X and the rotation velocity V calculated by the corresponding encoder signal processing circuit 23 of the motor A, B or C are obtained from the encoder signal processing circuit 23 as information of a controlled variable. Based on the information X and V, each motor is feedback controlled. Here, description on a particular embodiment of feedback control is omitted. However, the controller 10 can be structured such that the rotation amount and the rotation velocity of each of the motors A, B and C are feedback controlled in a well-known manner.

The controller 10 includes a CPU 11 that performs various calculation processes, a ROM 13 that stores programs executed by the CPU 11, and a RAM 15 that is used as a work area at the time of execution of programs. The CPU 11 executes the programs stored in the ROM 13 to calculate a manipulated variable of each of the motors A, B and C. The calculated manipulated variable is set to the corresponding motor driving circuit 25 of the motor A, B or C so as to achieve motor control.

Particularly, the control system 1 of the first embodiment is designed to perform PWM control of each of the motors A, B and C. A PWM value is set as the manipulated variable to each of the motor driving circuits 25 by the controller 10. In other words, in the present embodiment, motor control is achieved as follows. That is, each of the motor driving circuits 25 turns on/off the corresponding motor A, B or C at a duty ratio corresponding to the set manipulated variable (PWM value) so as to adjust the rotation amount and the rotation velocity of the motor to the amount corresponding to the manipulated variable.

The rotation amount X and the rotation velocity V of each of the motors A, B and C rotated by such control are detected via the corresponding encoder 21 and encoder signal processing circuit 23 as previously mentioned. In the controller 10, a new manipulated variable is calculated based on the detection value to be set to the motor driving circuit 25. In the control system 1 of the first embodiment, motor control of each of the motors A, B and C is achieved by these operations.

Here, further particular description will be given on motor control achieved in the control system 1. In the first embodiment, the interruption signal Ir is periodically supplied from the timer 27 to the controller 10. Each time the interruption signal Ir is supplied to the controller 10, the motor of which control cycle has arrived is detected so that an acquisition operation of the controlled variable (the rotation amount X and the rotation velocity V calculated in the encoder signal processing circuit 23) and a setting operation of the manipulated variable to the motor driving circuit 25 are executed per motor of which control cycle has arrived.

Also in the first embodiment, prior to control of the plurality of motors A, B and C as such, an input cycle Ts of the interruption signal supplied from the timer 27 and the control cycle of each of the motors A, B and C are defined as follows at the design stage. FIG. 4 is an explanatory view showing setting steps of the input cycle Ts of the interruption signal Ir and a control cycle Ts1 of the motor A, a control cycle Ts2 of the motor B and a control cycle Ts3 of the motor C.

Upon setting the cycles Ts, Ts1, Ts2 and Ts3, a greatest common divisor Tm is calculated of the optimal control cycles Tr_A, Tr_B and Tr_C of the respective motors A, B and C (step [1]). The calculated greatest common divisor Tm is determined to be the input cycle Ts of the interruption signal (step [2]). The optimal control cycles Tr_A, Tr_B and Tr_C are ideal control cycles to be set to the control system 1, which can be defined by a designer through experiment or desktop calculation. Here, the control cycles Tr_A, Tr_B and Tr_C are converted according to a scale of integer values to calculate the greatest common divisor Tm.

In case that the greatest common divisor Tm is calculated to determine the input cycle Ts in this manner, the input cycle Ts is a fraction of N (N: integer) of the control cycle Tr_A of the motor A having the shortest optimal control cycle (Ts=Tr_A/N). In the first embodiment, it is assumed that the optimal control cycle Tr_A of the motor A, the optimal control cycle Tr_B of the motor B and the optimal control cycle Tr_C of the motor C has a relation that Tr_A≦Tr_B≦Tr_C.

Here, if the optimal control cycles Tr_B and Tr_C of the motors B and C are integer multiples of the optimal control cycle Tr_A, a value '1' is set to N (N=1). However, if a system is built which controls three or more motors, it is uncommon for the optimal control cycles Tr_B and Tr_C of the motors B and C to be integer multiples of the optimal control cycle Tr_A of the motor A. Thus, the input cycle Ts is generally an integer fraction of the control cycle Tr_A and set to a half or below the control cycle Tr_A. The prior art is different from the present embodiment in that the control cycle Tr_A of the motor A having the shortest optimal control cycle is set to the input cycle Ts of the interruption signal.

In the first embodiment, after the input cycle Ts is determined in this manner, control cycles Ts1, Ts2 and Ts3 of the motors A, B and C are defined as integer multiples of the determined input cycles Ts.

Particularly, the control cycle Ts1 of the motor A is determined to be (Tr_A/Ts) times as long as the input cycle Ts, the control cycle Ts2 of the motor B is determined to be (Tr_B/Ts) times as long as the input cycle Ts, and the control cycle Ts3 of the motor C is determined to be (Tr_C/Ts) times as long as the input cycle Ts (step [3]).

After the step [3], the input cycle Ts of the interruption signal, the control cycle Ts1 of the motor A, the control cycle Ts2 of the motor B, and the control cycle Ts3 of the motor C are set according to results of determinations to build the control system 1 (step [4]).

For example, if the optimal control cycle Tr_B of the motor B corresponds to (4·Tr_A/3) and the optimal control cycle Tr_C of the motor C corresponds to (5·Tr_A/3) for the optimal control cycle Tr_A of the motor A, the input cycle Ts of the interruption signal is set as Tr_A/3 (Ts=Tr_A/3), the control cycle Ts1 of the motor A is set as 3·Ts (Ts1=3·Ts), the control cycle Ts2 of the motor B is set as 4·Ts (Ts2=4·Ts), and the control cycle Ts3 of the motor C is set as 5·Ts (Ts3=5·Ts).

Figure 5:
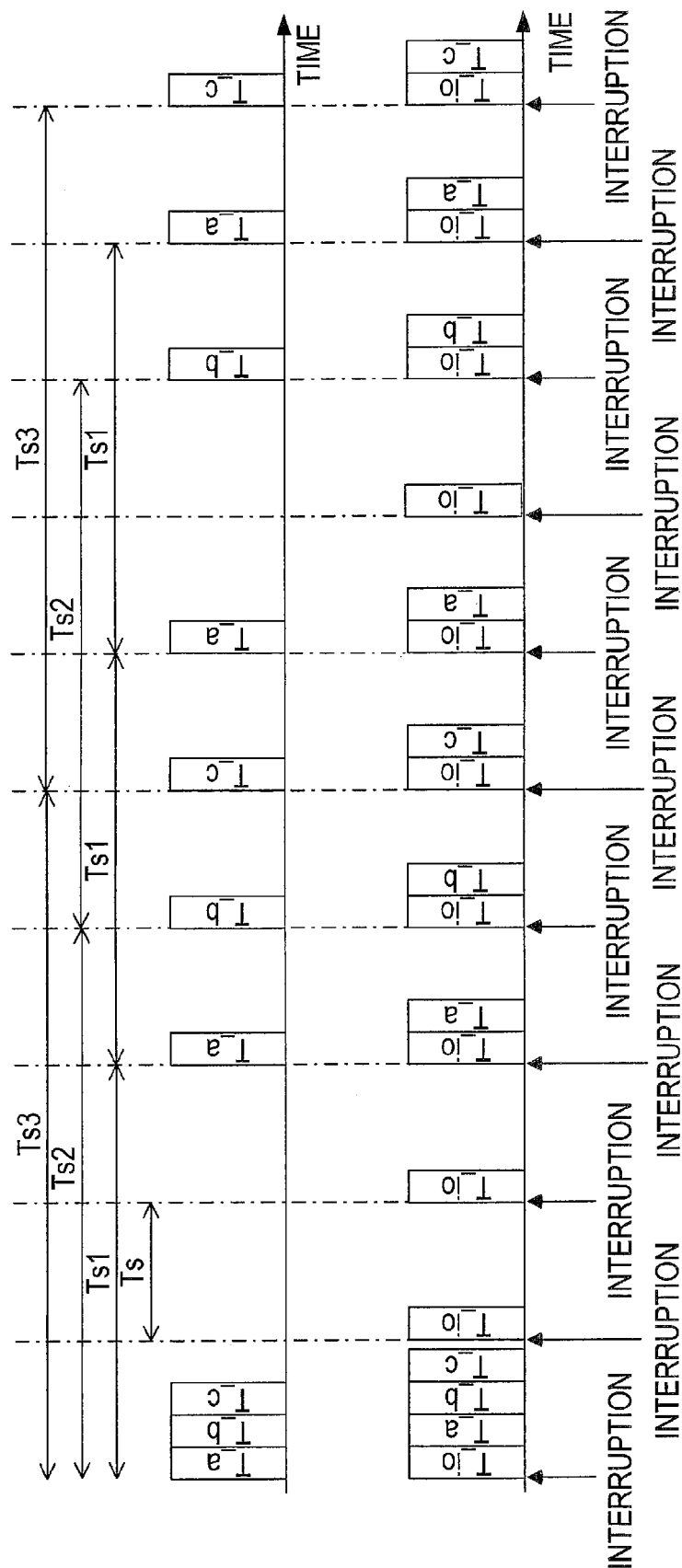
FIG. 5 is a time chart showing an acquisition period of a control variable, a setting period of a manipulated variable, and calculation periods of the manipulated variables of the plurality of motors.
Figure 6A:
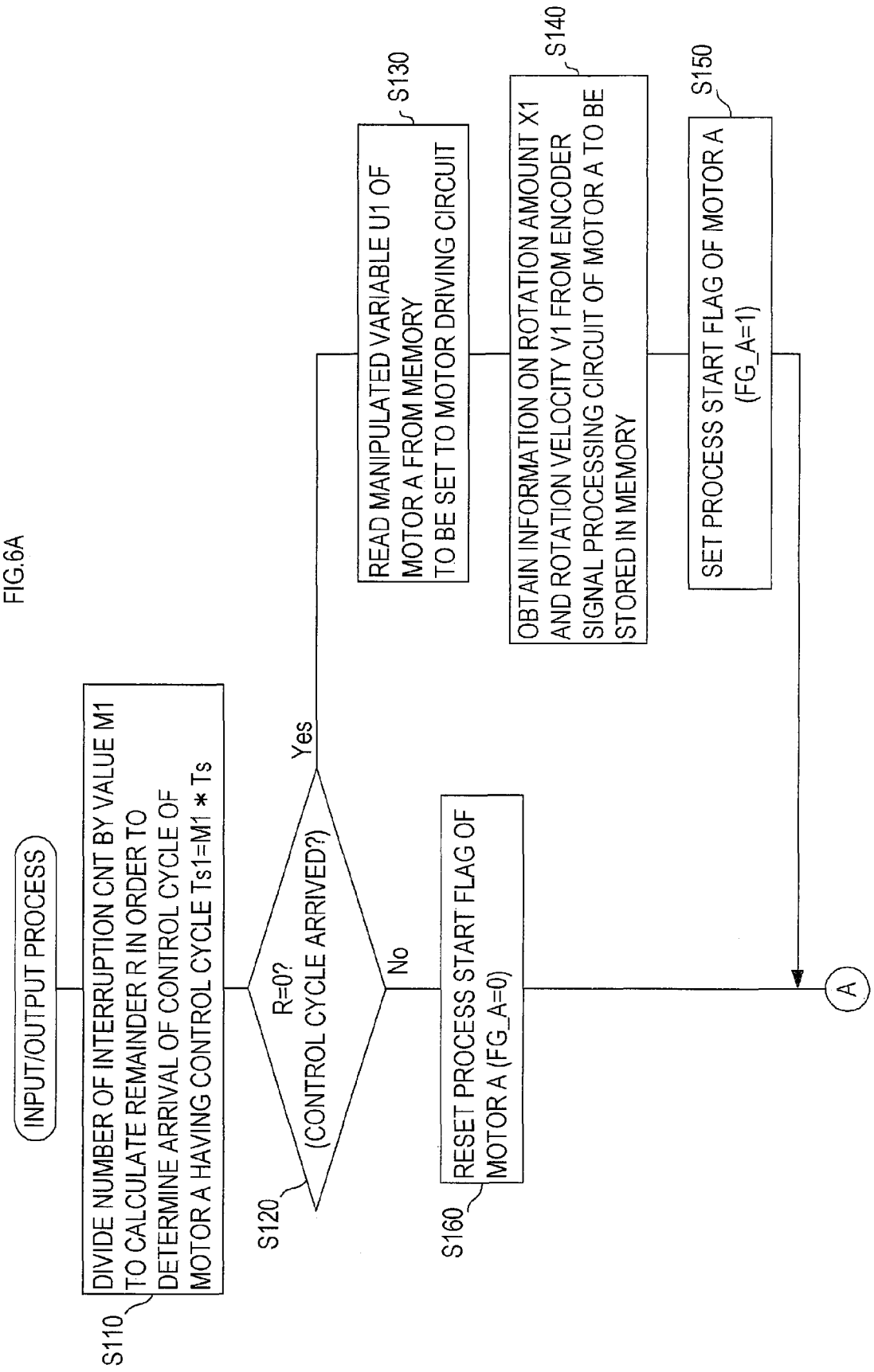
FIG. 6A is a flowchart showing an initial part of an input/output process executed by a controller of the first embodiment.
Figure 6D:
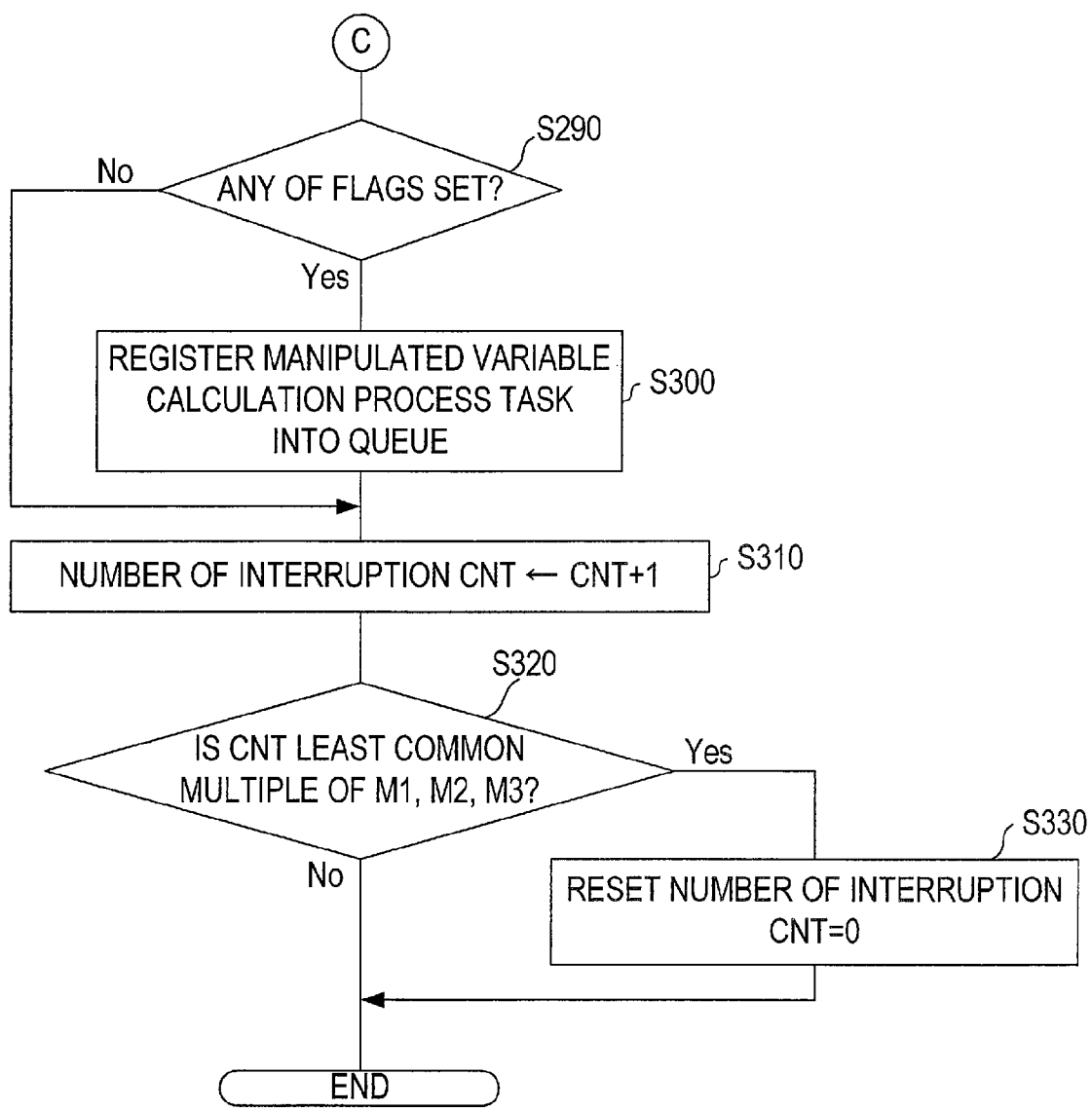
FIG. 6D is a flowchart showing a last part of the input/output process executed by the controller of the first embodiment.

A time chart shown in the upper part of FIG. 5 is a time chart showing a pattern of a calculation period T_a of a manipulated variable U1 of the motor A, a calculation period T_b of a manipulated variable U2 of the motor B, and a calculation period T_c of a manipulated variable U3 of the motor C along a time axis. The manipulated variables U1, U2 and U3 are calculated in the controller 10 when the cycles Ts, Ts1, Ts2 and Ts3 are set as above. In this case, in the control unit 10 of the control system 1 in the first embodiment, the initial interruption is counted as zero, the manipulated variable of the motor A is calculated each time a number of interruption CNT is equal to a multiple of three, the manipulated variable of the motor B is calculated each time the number of interruption CNT is equal to a multiple of four, and the manipulated variable of the motor C is calculated each time the number of interruption CNT is equal to a multiple of five.

In the first embodiment, unlike the conventional device in which the manipulated variable is set after the calculation of the manipulated variable, an input/output process (see FIGS. 6A, 6B, 6C and 6D) is executed prior to the calculation of the manipulated variable to set a precalculated manipulated variable of the motor to the motor driving circuit 25. A time chart shown in the lower part of FIG. 5 is a time chart showing an actual operation of the controller 10. Here, an execution period T_io of the input and output process is incorporated into a calculation period of the manipulated variable of each motor shown in the time chart in the upper part of FIG. 5. The time chart shown in the lower part of FIG. 5 also shows patterns of the execution periods T_io, T_a, T_b and T_c of the respective processes.

That is, in the first embodiment, each time the interruption signal Ir is supplied from the timer 27 in the cycle Ts, the input/output process shown in FIGS. 6A to 6D is performed as an interruption process (exceptional process) by the CPU 11. Thereby, the setting operation of the manipulated variable is achieved prior to a calculating operation of the manipulated variable. FIGS. 6A to 6D are flowcharts showing the input/output process executed in the controller 10.

When the input/output process shown in FIGS. 6A to 6D is started, firstly the number of interruption CNT is divided by a value M1 to calculate a remainder R in order to determine whether the control cycle of the motor A having the control cycle Ts1=M1·Ts has arrived (S110). A value zero is set to an initial value of the number of interruption CNT. Each time the interruption signal Ir is supplied, the number of interruption CNT is counted up in S310. The number of interruption CNT in which the initial interruption is not counted is stored in the RAM 15.

After the calculation of the remainder R, the process moves to S120. It is determined whether the remainder R is equal to zero so as to determine whether the control cycle of the motor A has arrived.

For example, in case that the control cycle Ts1=3·Ts, the number of interruption CNT is divided by three to calculate the remainder R. It is determined whether the number of interruption CNT is a multiple of three by determining whether the remainder R is equal to zero. If the remainder R is equal to zero, it is determined that the number of interruption CNT is a multiple of three and the control cycle of the motor A has arrived (S120:YES). The process moves to S130. On the other hand, if the reminder R is not equal to zero, it is determined that the control cycle of the motor A is not arrived (S120: NO), the process moves to S160.

When the process moves to S160, a process start flag FG_A of the motor A stored in the RAM 15 is reset to zero (FG_A=0). The process moves to S170. If the process moves to S130, the manipulated variable U1 of the motor A stored in the RAM 15 is read from the RAM 15 and the manipulated variable U1 is set to the motor driving circuit 25a of the motor A.

In the control system 1 of the first embodiment, initialization is carried out by the controller 10 prior to motor control. In the initialization, the manipulated variable U1 of the motor A, the manipulated variable U2 of the motor B, and the manipulated variable U3 of the motor C are initialized to zero and stored in the RAM 15.

Accordingly, the manipulated variable of zero is set to the motor driving circuit 25a at the time of initial execution of S130. In the first embodiment, the manipulated variable U1 stored in the RAM 15 is successively updated during execution of motor control. Accordingly, the updated manipulated variable U1 is set to the motor driving circuit 25a by the operation of the controller 10 on and after the second round of execution of S130.

If a value larger than zero is set to the motor driving circuit 25a as the manipulated variable in S130, the motor driving circuit 25a drives the motor A by turning on/off the motor A at a duty ratio corresponding to the manipulated variable. On the other hand, if a value zero is set as the manipulated variable, the motor driving circuit 25a stands by until the manipulated variable is updated, without substantially driving the motor A.

After the step of S130, the process moves to S140. The rotation amount X and the rotation velocity V of the motor A are obtained from the encoder signal processing circuit 23a of the motor A and stored in the RAM 15. The rotation amount X and the rotation velocity V of the motor A calculated in the encoder signal processing circuit 23a will be referred as a rotation amount X1 and a rotation velocity V1 hereinafter.

After the step of S140, the process moves to S150. A value '1' is set to the process start flag FG_A of the motor A (FG_A=1). The process move to S170.

In S170, the same step as S110 is executed to the motor B having the control cycle Ts2=M2·Ts. That is, the number of interruption CNT is divided by a value M2 to calculate a remainder R in order to determine whether the control cycle of the motor B has arrived (S170). After the calculation of the remainder R, the process moves to S180. It is determined whether the remainder R is equal to zero so as to determine whether the control cycle of the motor B has arrived.

For example, in case that the control cycle Ts2=4·Ts, the number of interruption CNT is divided by four to calculate the remainder R. It is determined whether the number of interruption CNT is a multiple of four by determining whether the remainder R is equal to zero. If the remainder R is equal to zero, it is determined that the number of interruption CNT is a multiple of four and the control cycle of the motor B has arrived (S180: YES), the process moves to S190. On the other hand, if the reminder R is not equal to zero, it is determined that the control cycle of the motor B is not arrived (S180: NO), the process moves to S220.

When the process moves to S220, a process start flag FG_B of the motor B stored in the RAM 15 is reset to zero (FG_B=0). The process moves to S230. If the process moves to S190, the manipulated variable U2 of the motor B stored in the RAM 15 is read from the RAM 15 and the manipulated variable U2 is set to the motor driving circuit 25b of the motor B.

Particularly, the manipulated variable of zero is set to the motor driving circuit 25b at the time of initial execution of S190. The manipulated variable U2 stored in the RAM 15 is successively updated during execution of motor control. Accordingly, the updated manipulated variable U2 is set to the motor driving circuit 25b by the operation of the controller 10 on and after the second round of execution of S190.

If a value larger than zero is set to the motor driving circuit 25b as the manipulated variable in S190, the motor driving circuit 25b drives the motor B by turning on/off the motor B at a duty ratio corresponding to the manipulated variable. On the other hand, if a value zero is set as the manipulated variable, the motor driving circuit 25b stands by until the manipulated variable is updated, without substantially driving the motor B.

After the step of S190, the process moves to S200. The rotation amount X and the rotation velocity V of the motor B are obtained from the encoder signal processing circuit 23b of the motor B and stored in the RAM 15. The rotation amount X and the rotation velocity V of the motor B calculated in the encoder signal processing circuit 23b will be referred as a rotation amount X2 and a rotation velocity V2 hereinafter.

After the step of S200, the process moves to S210. A value '1' is set to the process start flag FG_B of the motor B (FG_B=1). The process move to S230.

In S230, the same step as S110 is executed to the motor C having the control cycle Ts3=M3·Ts. That is, the number of interruption CNT is divided by a value M3 to calculate a remainder R in order to determine whether the control cycle of the motor C has arrived (S230). After the calculation of the remainder R, the process moves to S240. It is determined whether the remainder R is equal to zero so as to determine whether the control cycle of the motor C has arrived.

For example, in case that the control cycle Ts3=5·Ts, the number of interruption CNT is divided by five to calculate the remainder R. It is determined whether the number of interruption CNT is a multiple of five by determining whether the remainder R is equal to zero. If the remainder R is equal to zero, it is determined that the number of interruption CNT is a multiple of five and the control cycle of the motor C has arrived (S240: YES), the process moves to S250. On the other hand, if the reminder R is not equal to zero, it is determined that the control cycle of the motor C is not arrived (S240: NO), the process moves to S280.

When the process moves to S280, a process start flag FG_C of the motor C stored in the RAM 15 is reset to zero (FG_C=0). The process moves to S290. If the process moves to S250, the manipulated variable U3 of the motor C stored in the RAM 15 is read from the RAM 15 and the manipulated variable U3 is set to the motor driving circuit 25c of the motor C.

Particularly, the manipulated variable of zero is set to the motor driving circuit 25c at the time of initial execution of S250. The manipulated variable U3 stored in the RAM 15 is successively updated during execution of motor control. Accordingly, the updated manipulated variable U3 is set to the motor driving circuit 25c by the operation of the controller 10 on and after the second round of execution of S250.

If a value larger than zero is set to the motor driving circuit 25c as the manipulated variable in S250, the motor driving circuit 25c drives the motor C by turning on/off the motor C at a duty ratio corresponding to the manipulated variable. On the other hand, if a value zero is set as the manipulated variable, the motor driving circuit 25c stands by until the manipulated variable is updated, without substantially driving the motor C.

After the step of S250, the process moves to S260. The rotation amount X and the rotation velocity V of the motor C are obtained from the encoder signal processing circuit 23c of the motor C and stored in the RAM 15. The rotation amount X and the rotation velocity V of the motor C calculated in the encoder signal processing circuit 23c will be described as a rotation amount X3 and a rotation velocity V3 hereinafter.

After the step of S260, the process moves to S270. A value '1' is set to the process start flag FG_C of the motor C (FG_C=1). The process move to S290.

In S290, it is determined whether any one of the process start flags FG_A, FG_B and FG_C has been set (to a value '1') in the aforementioned steps. If it is determined that any one of the process start flags FG_A, FG_B and FG_C has been set (to a value '1') (S290: YES), the process moves to S300 to register a manipulated variable calculation process task (later explained in detail, see FIG. 7) into an execution waiting queue.

The controller 10 is basically designed such that a task registered in the execution waiting queue is executed in order of registration, except for the time when an exceptional process (such as the input/output process) is performed in response to the interruption signal. Upon execution of an exceptional process in response to the interruption signal, a task currently being executed is interrupted and the exceptional process is carried out on a priority basis. Thereafter, the interrupted task is restarted.

After the step of S300, the process moves to S310. On the other hand, if it is determined in S290 that all the process start flags FG_A, FG_B and FG_C are reset (to zero) (S290: NO), the process moves to S310, without executing S300.

In S310, the number of interruption CNT is updated by adding '1' (CNT←CNT+1). Thereafter, it is determined whether the number of interruption CNT is a least common multiple of the values M1, M2 and M3 (S320). In the first embodiment, since the input cycle Ts of the interruption signal is set as above, there is no common divisor of M1, M2 and M3 except for '1'. Accordingly, it is particularly determined whether the number of interruption CNT is equal to M1·M2·M3.

When it is determined that the number of interruption CNT is a least common multiple of M1, M2 and M3 (S320: YES), the process moves to S330. After the number of interruption CNT is updated to zero, the input/output process is ended. On the other hand, if it is determined that the number of interruption CNT is not a least common multiple of M1, M2 and M3 (S320: NO), the process is ended, without executing S330.

The steps of the input/output process are described in the above. The above input/output process is executed on a priority basis each time the interruption signal Ir is supplied from the timer 27. Accordingly, in the control system 1 of the first embodiment, the acquisition operation of the control variable and the setting operation of the manipulated variable are carried out per the cycle Ts without delay as shown in the time chart in the lower part of FIG. 5.

In the control system 1 of the first embodiment, when there is a motor of which control cycle has arrived, the manipulated variable calculation process task is registered into the execution waiting queue in the input/output process as noted above. After the execution of the input/output process, the manipulated variable calculation process task shown in FIG. 7 is executed by the controller 10.

As shown in FIG. 7, when the manipulated variable calculation process task is started, the value of the process start flag FG_A set in the input/output process is set to a local flag FL_A, the value of the process start flag FG_B is set to a local flag FL_B, and the value of the process start flag FG_C is set to a local flag FL_C (S410).

When the process moves to S420, it is determined whether the value set to the flag FL_A is equal to '1'. If it is determined that the value set to the flag FL_A is equal to '1' (S420: YES), it is determined that the control cycle of the motor A has arrived. The process moves to S430 to calculate a manipulated variable U1 of the motor A corresponding to a target rotation amount and a target rotation velocity based on information of the rotation amount X1 and the rotation velocity V1 of the motor A read from the encoder signal processing circuit 23a in the input/output process. The calculated manipulated variable U1 is stored in the RAM 15 (S435). Thereafter, the process moves to S440.

On the other hand, if it is determined in S420 that the value set to the flag FL_A is equal to zero (S420: NO), the process moves to S440 without executing S430 and S435.

When the process moves to S440, it is determined whether the value set to the flag FL_B is equal to '1'. If it is determined that the value set to the flag FL_B is equal to '1' (S440: YES), it is determined that the control cycle of the motor B has arrived. The process moves to S450 to calculate a manipulated variable U2 of the motor B corresponding to a target rotation amount and a target rotation velocity based on information of the rotation amount X2 and the rotation velocity V2 of the motor B read from the encoder signal processing circuit 23b in the input/output process. The calculated manipulated variable U2 is stored in the RAM 15 (S455). Thereafter, the process moves to S460.

On the other hand, if it is determined in S440 that the value set to the flag FL_B is equal to zero (S440: NO), the process moves to S460 without executing S450 and S455.

When the process moves to S460, it is determined whether the value set to the flag FL_C is equal to '1'. If it is determined that the value set to the flag FL_C is equal to '1' (S460: YES), it is determined that the control cycle of the motor C has arrived. The process moves to S470 to calculate a manipulated variable U3 of the motor C corresponding to a target rotation amount and a target rotation velocity based on information of the rotation amount X3 and the rotation velocity V3 of the motor C read from the encoder signal processing circuit 23c in the input/output process. The calculated manipulated variable U3 is stored in the RAM 15 (S475). Thereafter, the manipulated variable calculation process task is ended.

On the other hand, if it is determined in S460 that the value set to the flag FL_C is equal to zero (S460: NO), the manipulated variable calculation process task is ended, without executing S470 and S475.

In the above, the structure and the operation of the control system 1 of the first embodiment are described. In the control system 1 of the first embodiment, the interruption signal Ir is supplied to the controller 10. When the input/output process is executed by the controller 10, the manipulated variable calculation process task is registered in the execution waiting queue to be executed after the execution of the input/output process, as noted above.

Particularly in the first embodiment, if the control cycle Ts1 of the motor A is set as 3·Ts (Ts1=3·Ts), the control cycle Ts2 of the motor B is set as 4·Ts (Ts2=4·Ts), and the control cycle Ts3 of the motor C is set as 5·Ts (Ts3=5·Ts), the input/output process and the manipulated variable calculation process task are executed in a pattern shown in the time chart in the lower part of FIG. 5. An execution period of the manipulated variable calculation process task corresponds to a set of calculation periods T_a, T_b and T_c of the manipulated variables in the time chart in the lower part of FIG. 5.

As noted above, in the first embodiment, upon arrival of the control cycle, the manipulated variable to be set at the time of arrival of the next control cycle is precalculated and stored in the RAM 15. When the interruption signal Ir is supplied, the input/output process is executed on a priority basis to acquire the controlled variable. At the same time, the manipulated variable stored in the RAM 15 is set to the motor driving circuit 25. Thereby, according to the control system 1, fluctuation in calculation time of the manipulated variable does not affect the execution period of the acquisition operation of the controlled variable and the setting operation of the manipulated variable. The acquisition operation of the controlled variable and the setting operation of the manipulated variable can be carried out at a certain cycle in a stable manner. Thus, each of the motors A, B and C can be controlled with precision by the single controller 10, according to the first embodiment.

Figure 8A:
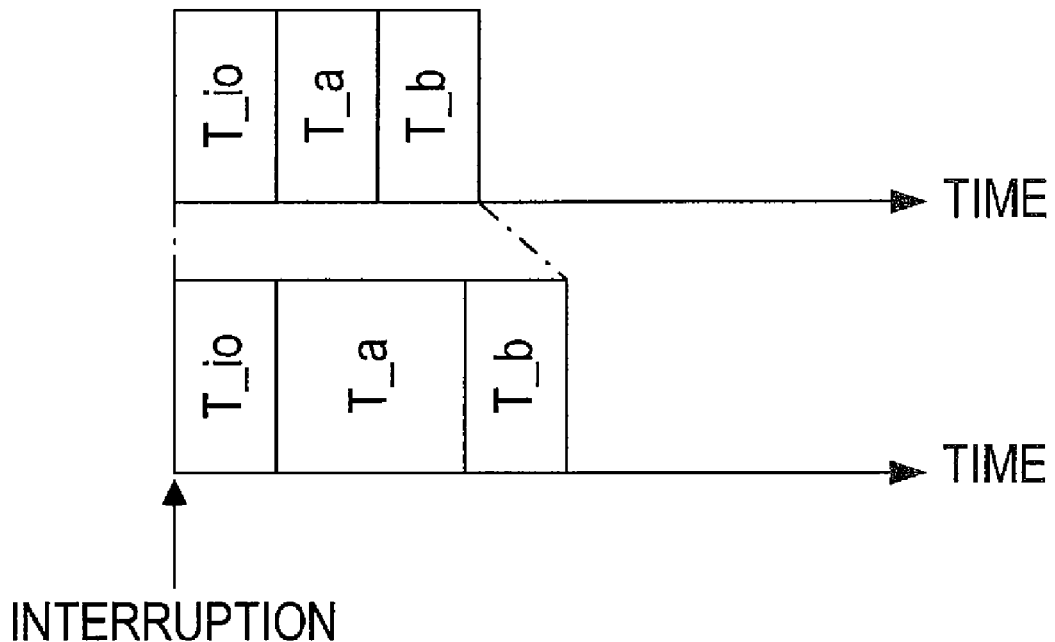
FIG. 8A is a time chart showing an example of an execution period $T\_io$ of the input/output process, a calculation period $T\_a$ of a manipulated variable U1, and a calculation period $T\_b$ of a manipulated variable U2 in the control system according to the first embodiment.
Figure 8B:
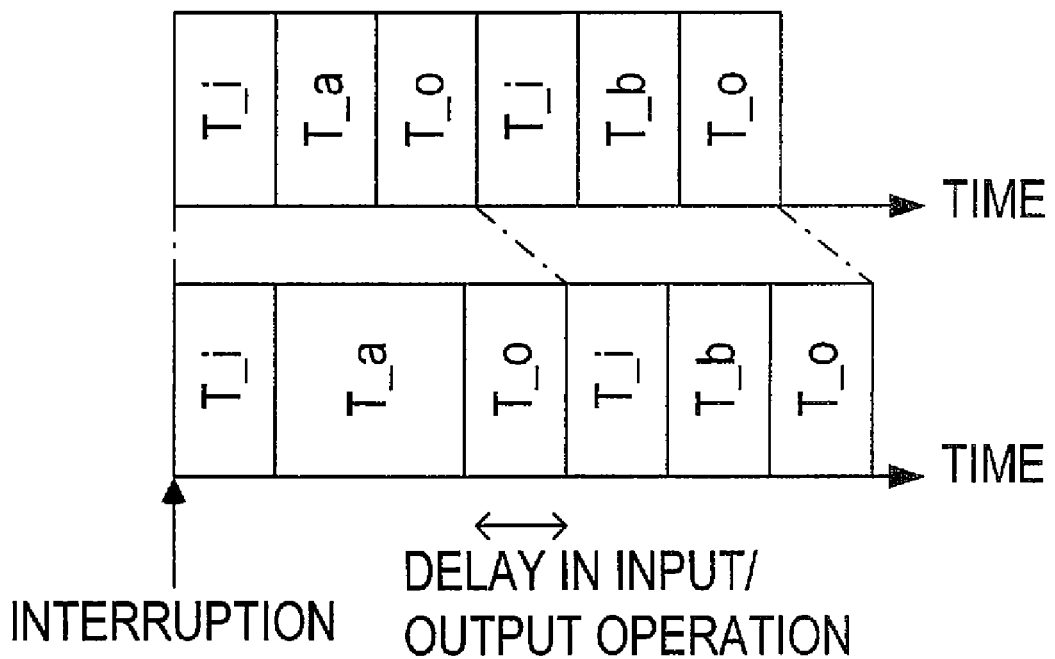
FIG. 8B is a time chart showing an example of the calculation period $T\_a$ of the manipulated variable U1, and the calculation period $T\_b$ of the manipulated variable U2 calculated by a controller, an acquisition period $T\_i$ of a controlled variable, and a setting period $T\_o$ of a manipulated variable in a conventional control system.

Particular explanation will be given on this point by way of FIGS. 8A and 8B. FIG. 8A shows an example of the execution period T_io of the input/output process, the calculation period T_a of the manipulated variable U1, and the calculation period T_b of the manipulated variable U2 in the control system 1 of the first embodiment, with a horizontal axis as a time scale. FIG. 8B shows an example of the calculation period T_a of the manipulated variable U1 of the motor A, the calculation period T_b of the manipulated variable U2 of the motor B calculated by the controller, and an acquisition period T_i of the controlled variable and the setting period T_o of the manipulated variable, in the conventional control system, with a horizontal axis as a time scale.

As shown in FIG. 8B, in the conventional system, when the interruption signal is supplied, the control variable of the motor A is acquired (period T_i). Then, the manipulated variable of the motor A is calculated (period T_a). The calculated manipulated variable is set to the motor driving circuit 25a (period T_o). Moreover, if there are a plurality of motors of which control cycles have arrived, the controlled variable of the next motor B is acquired (period T_i). Thereafter, the manipulated variable of the motor B is calculated (period T_b). Then, the calculated manipulated variable is set to the motor driving circuit 25b (period T_o).

Accordingly, in the conventional system, for example if calculation of the manipulated variable U1 of the motor A takes longer (see the time chart in the lower part of FIG. 8B) than normal (see the time chart in the upper part of FIG. 8B), not only the setting operation of the manipulated variable U1 but the acquisition operation of the controlled variable and the setting operation of the manipulated variable U2 of the motor B next to follow are delayed. The acquisition operation of the controlled variable and the setting operation of the manipulated variable of each motor cannot be precisely executed at the certain period Ts. Particularly, if there are many motors of which control cycles have arrived, execution timing of the acquisition operation of the controlled variable and the setting operation of the manipulated variable of the low-priority motor is greatly changed in a cumulative manner by extension of the calculating operation of the manipulated variable of the high-priority motor. Accordingly, control performance of the low-priority motor is largely deteriorated in the case of the conventional system.

In the control system 1 of the first embodiment, each time the interruption signal is supplied, the acquisition operation of the controlled variable and the setting operation of the manipulated variable (execution period T_io) are executed prior to the calculating operation of the manipulated variable (periods T_a and T_b), as shown in FIG. 8A. Thus, according to the control system 1, even if the calculation time of the manipulated variable takes longer (see the time chart in the lower part of FIG. 8A) than normal (see the time chart in the upper part of FIG. 8A), the execution cycle of the acquisition operation of the controlled variable and the setting operation of the manipulated variable can be kept constant. Also, if there are a plurality of motors of which control cycles have arrived, the input/output process (T_io) is executed prior to the calculating operation of the manipulated variables of all motors. Thus, the execution cycle of the acquisition operation of the controlled variable and the setting operation of the manipulated variable of each motor is not fluctuated by extension of the calculation time of other motors.

Thereby, according to the control system 1 of the first embodiment, the acquisition operation of the controlled variable and the setting operation of the manipulated variable of each motor can be periodically executed more precisely than before. As a result, each motor can be controlled with high precision.

Also in the first embodiment, when it takes more time than usual to calculate the manipulated variables U1, U2 and U3 and the manipulated variable calculation process task is not completed by the input time of the next interruption signal, the manipulated variable calculation process task currently being executed is interrupted so that the input/output process is executed on a priority basis. Accordingly, in the control system 1 of the first embodiment, extension of the calculation time of the manipulated variable does not affect the execution timing of the acquisition operation of the controlled variable and the setting operation of the manipulated variable. The acquisition operation of the controlled variable and the setting operation of the manipulated variable can be stably executed at a constant cycle.

Figure 9:
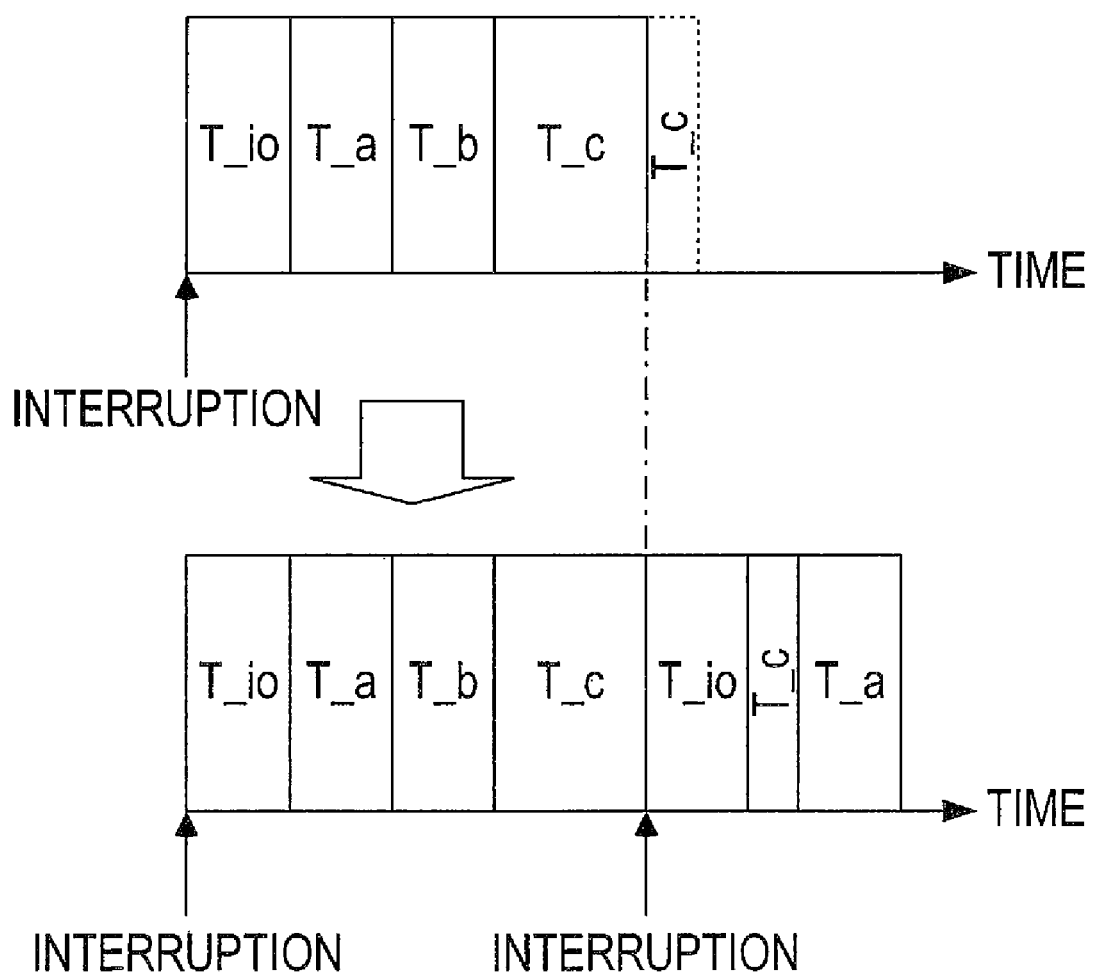
FIG. 9 is a time chart showing the execution periods $T\_io$, $T\_a$, $T\_b$, and $T\_c$ of the respective processes in case that the manipulated variable calculation process task is not completed by input time of the interruption signal.

FIG. 9 is a time chart showing an example of the case when the manipulated variable calculation process task is not completed by the input time of the next interruption signal. In FIG. 9, a horizontal axis is taken as a time scale and the execution periods T_io, T_a, T_b and T_c of respective processes are arranged along the time scale.

In the first embodiment, the acquisition operation of the controlled variable and the setting operation of the manipulated variable are periodically executed at the time interval Ts by executing the input/output process on a priority basis as shown in the time chart in the lower part of FIG. 9. Also in the first embodiment, even if the manipulated variable cannot be calculated within the time interval Ts, the manipulated variable calculation process task is restarted from the point interrupted after completion of the input/output process, as shown in the time chart in the lower part of FIG. 9.

Accordingly, in the control system 1 of the first embodiment, even if calculation of the manipulated variable is extended, it is possible to calculate the manipulated variables U1, U2 and U3 of respective motors by the time of arrival of the next control cycle. As a result, each of the motors A, B and C can be controlled with high precision.

In the example shown in FIG. 9, the interruption signal is supplied after the calculation of the manipulated variable U3 of the motor C is started. As a result, the manipulated variable calculation process task is interrupted in response to this input of the interruption signal. After the input/output process is executed and completed, the manipulated variable calculation process task is restarted from the interrupted calculation step to calculate the manipulated variable U3.

Also, when there is another manipulated variable calculation process task registered into the execution waiting queue in the input/output process, the another manipulated variable calculation process task (T_a) is to be newly executed by the controller 10 after the interrupted manipulated variable calculation process task is completed. Thus, in the first embodiment, even if the calculation of the manipulated variable is extended and the manipulated variable cannot be calculated within the time interval Ts, each of the manipulated variables U1, U2 and U3 can be appropriately calculated. As a result, each of the motors A, B and C can be controlled with high precision. That is, the control system 1 according to the first embodiment is a system that appropriately controls a plurality of motors by a single controller 10 (CPU 11).

Also in the first embodiment, while the acquisition operation of the controlled variable and the setting operation of the manipulated variable of respective motors can be executed at the constant cycle Ts by the aforementioned technique, the greatest common divisor of the optimal control cycles of respective motors is set to the cycle Ts so that the control cycle of each motor can be more appropriately set than before. Accordingly, the single controller 10 (CPU 11) can programmatically achieve motor control with high precision. Thus, an inexpensive control system with enhanced performance can be built in the first embodiment.

Second Embodiment

The second embodiment is identical to the first embodiment except that settings of the input cycle Ts and control cycles Ts1, Ts2 and Ts3 of the motors A, B and C are different from those in the first embodiment. Accordingly, description is given only on the portions that are different from the first embodiment, and description is omitted on the identical portions.

Figure 10:
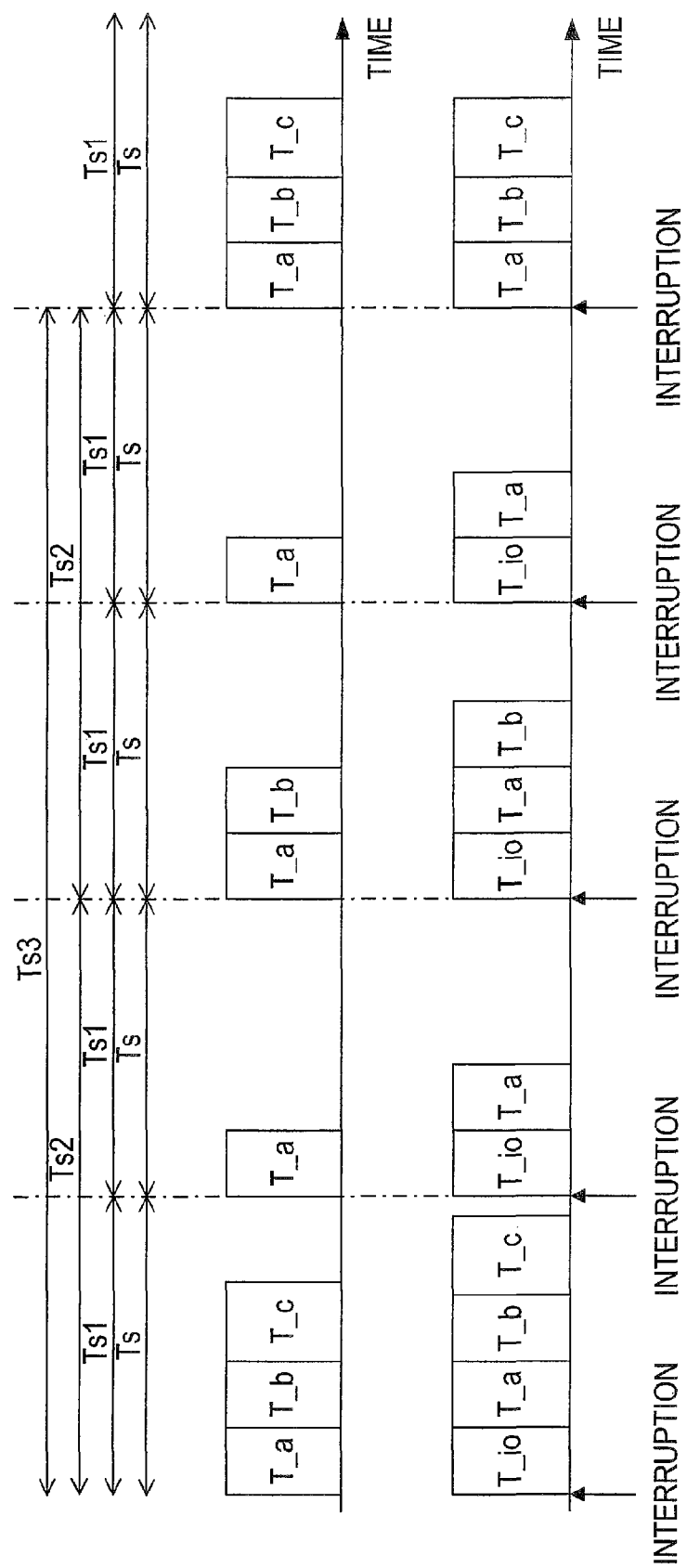
FIG. 10 is a time chart showing the acquisition period of the controlled variable and setting period of the manipulated variable ($T\_io$) and the calculation periods of the manipulated variables of the respective motors ($T\_a$, $T\_b$, $T\_c$) according to a second embodiment.
Figure 11:
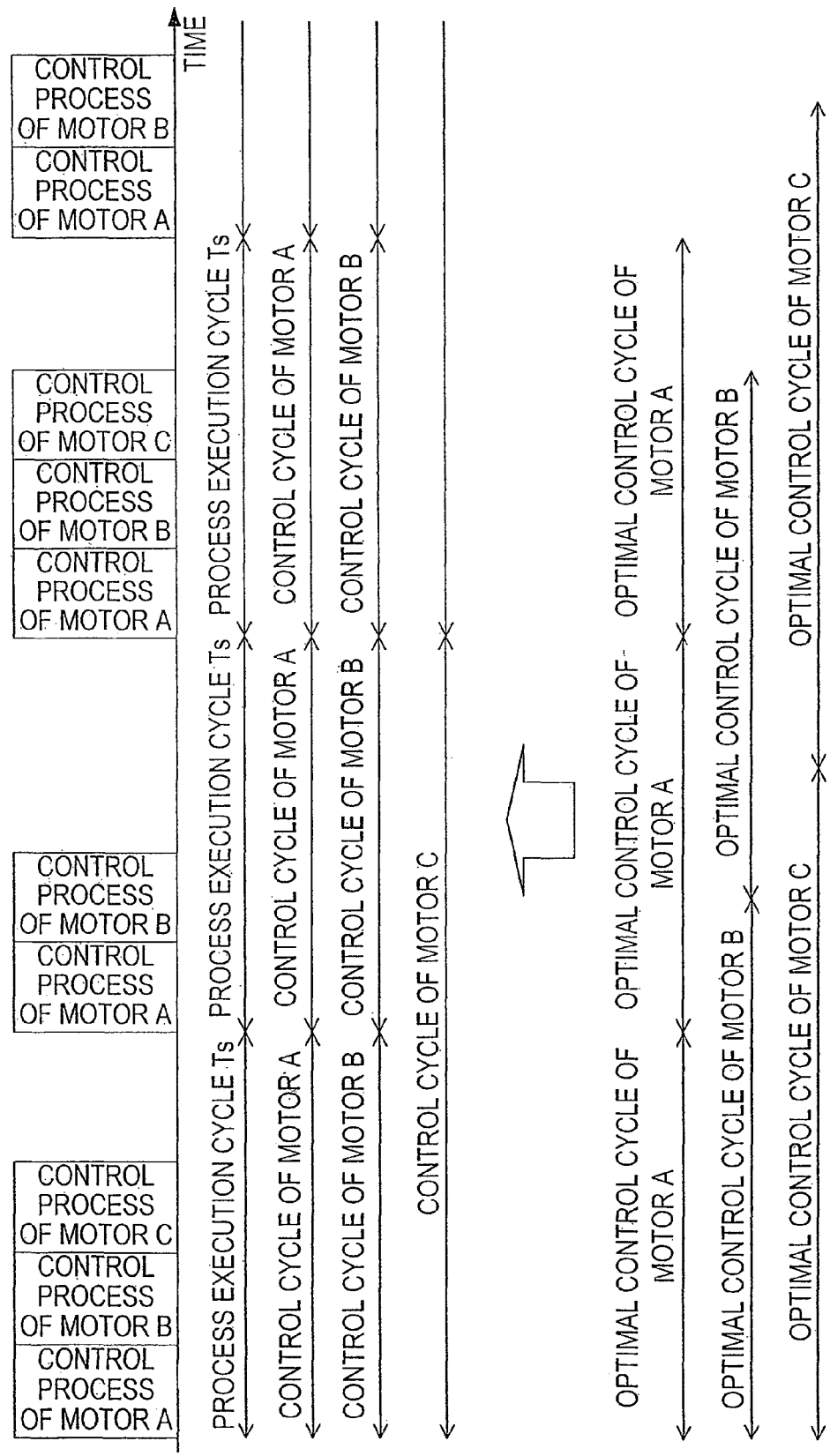
FIG. 11 is an explanatory view concerning a conventional motor control method.

FIG. 10 is a time chart showing a pattern of the calculation period T_a of the manipulated variable U1 of the motor A, the calculation period T_b of the manipulated variable U2 of the motor B, and the calculation period T_c of the manipulated variable U3 of the motor C in the second embodiment along a time axis.

In the second embodiment, as shown in FIG. 10, the control cycle Ts1 of the motor A is set equal to the input cycle Ts of the interruption signal, the control cycle Ts2 of the motor is set to be twice as long as the input cycle Ts of the interruption signal, and the control cycle Ts3 of the motor C is set to be four times as long as the input cycle Ts of the interruption signal. That is, in the control system of the second embodiment, each time the interruption signal Ir is supplied, the manipulated variable U1 of the motor A is calculated. Assuming that the initial interruption is counted as zero, each time the number of interruption CNT is equal to a multiple of two, the manipulated variable U2 of the motor B is calculated, and, each time the number of interruption CNT is equal to a multiple of four, the manipulated variable U3 of the motor C is calculated.

The flow of the input/output process in the second embodiment is substantially the same as that of the input/output process in the first embodiment shown in FIGS. 6A to 6D. In the input/output process of the second embodiment, the steps corresponding to S110 to S160 are executed in order of the motor having a shorter control cycle on a priority basis. Due to the fact that the input cycle Ts and the control cycles Ts1, Ts2 and Ts3 are set as above, the following steps are different in the second embodiment from those of the first embodiment.

Referring to FIGS. 6A to 6D, in S110 of the second embodiment, in case that the control cycle Ts1=1·Ts, the number of interruption CNT is divided by one to calculate a remainder R.

Since the remainder is always zero in S110, the step of S120 is positively determined (S120: YES) each time the interruption signal is supplied and the process moves to S130. In this case, S120 is considered a redundant step. Thus, in case that the control cycle Ts1 is not set to be varied, the controller 10 may be configured such that the process always moves to S130 after the step of S110, without executing the step of S120.

Also in S170 of the second embodiment, in case that the control cycle Ts2=2·Ts, the number of interruption CNT is divided by two to calculate a remainder R. Whether or not the number of interruption CNT is a multiple of two is determined by determining whether or not the remainder R is equal to zero. If the remainder R is equal to zero, it is determined that the number of interruption CNT is a multiple of two and the control cycle Ts2 of the motor B has arrived (S180: YES). The process moves to S190. On the other hand, if the remainder R is not equal to zero, it is determined that the control cycle Ts2 has not arrived (S180: NO), the process moves to S220.

Also in S230 of the second embodiment, in case that the control cycle Ts3=4·Ts, the number of interruption CNT is divided by four to calculate a remainder R. Whether or not the number of interruption CNT is a multiple of four is determined by determining whether or not the remainder R is equal to zero. If the remainder R is equal to zero, it is determined that the number of interruption CNT is a multiple of four and the control cycle Ts3 of the motor C has arrived (S240: YES). The process moves to S250. On the other hand, if the remainder R is not equal to zero, it is determined that the control cycle Ts3 has not arrived (S240: NO). the process moves to S280.

Also in S320 of the second embodiment, in case that M1=1, M2=2, and M3=4, each time the number of interruption CNT is a multiple of four, the number of interruption CNT is updated to zero.

According to the control system 1 of the second embodiment, control input/output can be performed in a certain cycle. Thus, the control theory that control input/output should be performed in a certain cycle can be suitably applied to actual control. As a result, a control target can be controlled with high precision.

The embodiments of the present invention are described in the above. However, the present invention should not be limited by the above described embodiments, and can be practiced in various manners. For instance, the control system 1 of the above embodiments controls a total of three motors. However, the present invention can be applied to a control system including one, two, four or more motors. Also, in the above embodiments, each time the number of interruption CNT is equal to the least common multiple of the values M1, M2 and M3, the number of interruption CNT is reset to zero in S330. However, the control system 1 of the above embodiments can be also designed so as not to execute the step of S330.

Also, in the above embodiment, the timer 27 supplies the interruption signal Ir to the controller 10 each time the input cycle Ts arrives. However, the timer 27 may be set to count the number of arrival of the input cycle Ts, and supply the interruption signal Ir to the controller 10 when the count value reaches a number corresponding to the control cycle of each motor. In this case, the motor of which control cycle has arrived is determined by the controller 10 when the interruption signal Ir is supplied. The manipulated variable of the motor of which control cycle has arrived may be set to the motor driving circuit provided corresponding to the motor.

In the above embodiment, calculation of the manipulated variable U1 of the motor A having the shortest control cycle is executed on a priority basis in the manipulated variable calculation process task. However, the manipulated variable calculation process task may be designed to execute calculation of the manipulated variable U3 of the motor C having the longest control cycle on a priority basis. In this case, each time the interruption signal Ir is supplied, calculation of the manipulated variable U1 of the motor A is delayed in the manipulated variable calculation process task. Thus, calculation of the manipulated variable U1 may not be completed until the next input time of the interruption signal Ir.

Accordingly, in case that calculation of the manipulated variable U1 is not completed by the input time of the interruption signal Ir, the controller 10 may be designed such that the calculation of the manipulated variable U1 is ended at the point of input of the interruption signal. Then, without restarting the calculation of the manipulated variable U1 even after execution of the input/output process, a new manipulated variable calculation process task is executed to calculate the manipulated variable U1 of the motor A. It is not necessary to restart calculation with respect to the motor of which manipulated variable should be calculated each time the interruption signal is supplied, even if the calculation of the variable is not completed by the input time of the interruption signal.

Accordingly, the control system 1 constituted as such does not require restart of the calculation of the manipulated variable U1 of which calculation was delayed even after the execution of the input/output process. Useless processing load can be inhibited from being applied to the controller 10.

What is claimed is:

1. A motor control device comprising:
a plurality of operating units, each provided corresponding to each of a plurality of motors, to operate each of the plurality of motors; and
a control unit that, each time each of a plurality of control cycles corresponding to each of the plurality of motors arrives in which each of the plurality of motors is operated, performs a setting operation and an acquisition operation for a number of times corresponding to a motor among the plurality of motors for which corresponding control cycles have arrived, and thereafter performs a registration operation,
wherein the setting operation is an operation for setting a manipulated variable of the motor among the plurality of motors for which the corresponding control cycle has arrived, previously calculated based on a previously-acquired control variable of the motor to the perating unit among the plurality of operating units that operates the motor for which the corresponding control cycle has arrived,
wherein the acquisition operation is an operation for acquiring a current control variable of the motor for which the corresponding control cycle has arrived, and
wherein the registration operation is an operation for registering a manipulated variable calculation process task of the motor for which the corresponding control cycle has arrived into an execution waiting queue, wherein the manipulated variable calculation process task is a task for calculating a manipulated variable of the motor for which the corresponding control cycle has arrived based on the current control variable acquired by the acquisition operation.

2. The motor control device as set forth in claim 1, wherein the control unit sets, during the setting operation, a manipulated variable of the motor having the shortest control cycle out of the plurality of control cycles to the operating unit among the plurality of operating units provided corresponding to the motor having the shortest control cycle for every N (N: an integer of two and above)×S (S: an integer of one and above) times an execution cycle arrives which is 1/Nth of the shortest control cycle, while the control unit sets, during the setting operation, a manipulated variable of the motor other than the motor having the shortest control cycle to the operating unit among the plurality of operating units provided corresponding to the motor other than the motor having the shortest control cycle for every M (M: an integer of N and above)×S times the execution cycle arrives.

3. The motor control device as set forth in claim 2, wherein the execution cycle is equal to a common divisor of the plurality of control cycles.

4. The motor control device as set forth in claim 2, wherein the control unit includes one microcomputer, and the microcomputer executes a program that makes the microcomputer function as the control unit.

5. The motor control device as set forth in claim 1, wherein the control unit sets, during the setting operation, a manipulated variable to the operating unit provided corresponding to the motor among the plurality of motors for which the corresponding control cycle has arrived each time an execution cycle arrives which is equal to a common divisor of the plurality of control cycles and smaller than the shortest control cycle out of the plurality of control cycles.

6. The motor control device as set forth in claim 5, further comprising a timer unit that measures a time elapsed from a predetermined reference time, wherein
each time the execution cycle arrives, the controller divides the time measured by the timer unit by each of the plurality of control cycles to identify the motor of for which the corresponding control cycle has arrived based on each of a plurality of remainders obtained by division.

7. The motor control device as set forth in claim 1, further comprising:
a plurality of rotation amount detecting units, each provided corresponding to one of the plurality of motors, to detect a rotation amount of each of the plurality of motors; and
a storage unit that stores the manipulated variable of each of the plurality of motors, wherein
the control unit includes
an input/output unit that acquires a detection result from each of the plurality of rotation amount detecting units and the manipulated variable of the motor for which the corresponding control cycle has arrived from the storage unit to set the acquired manipulated variable to the operating unit corresponding to the motor for which the corresponding control cycle has arrived during the setting operation and the acquisition operation, and
a manipulated variable calculation unit that, when the manipulated variable of the motor for which the corresponding control cycle has arrived is set by the input/output unit, executes the manipulated variable calculation process task registered into the execution waiting queue to newly calculate the manipulated variable of the motor for which the corresponding control cycle has arrived based on the detection result acquired by the input/output unit to store the calculated manipulated variable in the storage unit.

8. The motor control device as set forth in claim 7, wherein the input/output unit sets the manipulated variable stored in the storage unit in the control cycle a predetermined number of times ahead to the operating unit provided corresponding to the motor for which the corresponding control cycle has arrived.

9. The motor control device as set forth in claim 7, wherein the manipulated variable calculation unit sets the manipulated variable of the motor for which the corresponding control cycle has arrived and which is stored in the storage unit in the control cycle a predetermined number of times ahead to the operating unit provided corresponding to the motor.

10. The motor control device as set forth in claim 7, wherein
a control period of the plurality of motors includes a period in which the control cycles of at least two motors among the plurality of motors arrive at the same timing.

11. The motor control device as set forth in claim 7, wherein
the manipulated variable calculation unit, when calculation of the manipulated variable of the motor corresponding to one control cycle among the plurality of control cycles is not completed during a period from arrival of the one control cycle until arrival of the next control cycle, interrupts the calculation upon arrival of the next control cycle and restarts the calculation when the manipulated variable of the motor corresponding to the next control cycle is set by the manipulated variable calculation unit.

12. The motor control device as set forth in claim 7, wherein the manipulated variable calculation unit calculates the manipulated variable of at least two motors among the plurality of motors for which control cycles have arrived according to a predetermined order corresponding to lengths of the control cycles of the at least two motors.

13. The motor control device as set forth in claim 12, wherein the manipulated variable calculation unit calculates the manipulated variable of the motor in order of shortness of control cycle.

14. The motor control device as set forth in claim 7, wherein the control unit includes one microcomputer, and the microcomputer executes a program that makes the microcomputer function as the control unit.

15. A motor control device comprising:

at least one rotation amount detecting unit provided corresponding to at least one motor to detect a rotation amount of the at least one motor;

a storage unit that stores a manipulated variable of the at least one motor;

an input/output unit that acquires a detection result from the at least one rotation amount detecting unit and the manipulated variable of the at least one motor from the storage unit to set the acquired manipulated variable to at least one operating unit that operates the at least one motor each time at least one control cycle arrives in which the at least one motor is operated; and a manipulated calculation unit that, when the manipulated variable of the at least one motor is set by the input/output unit, executes a manipulated variable calculation process task registered into an execution waiting queue, wherein the manipulated variable calculation process task is a task for calculating a manipulated variable of the at least one motor based on the detection result acquired by the input/output unit to store the calculated manipulated variable in the storage unit.

* * * * *